United States Patent
Heuer et al.

(10) Patent No.: US 12,025,585 B2
(45) Date of Patent: Jul. 2, 2024

(54) MEASURING ARRANGEMENT AND METHOD FOR DETERMINING PROPERTIES OF A MATERIAL TO BE EXTRUDED WHILE A SCREW-EXTRUSION PROCESS IS BEING CARRIED OUT

(71) Applicant: Fraunhofer-Gesellschaft zur Förderung der Angewandten Forschung E.V., Munich (DE)

(72) Inventors: Henning Heuer, Dresden (DE); Frank Schubert, Dresden (DE); Marcel Wild, Dresden (DE)

(73) Assignee: Fraunhofer-Gesellschaft zur Förderung der Angewandten Forschung E.V., Munich (DE)

( * ) Notice: Subject to any disclaimer, the term of this patent is extended or adjusted under 35 U.S.C. 154(b) by 161 days.

(21) Appl. No.: 17/756,491

(22) PCT Filed: Nov. 4, 2020

(86) PCT No.: PCT/EP2020/080976
§ 371 (c)(1),
(2) Date: May 26, 2022

(87) PCT Pub. No.: WO2021/104819
PCT Pub. Date: Jun. 3, 2021

(65) Prior Publication Data
US 2023/0011838 A1    Jan. 12, 2023

(30) Foreign Application Priority Data
Nov. 27, 2019   (DE) .................... 10 2019 218 387.5

(51) Int. Cl.
*G01N 29/14*   (2006.01)
*B29C 48/92*   (2019.01)
(Continued)

(52) U.S. Cl.
CPC ............ *G01N 29/07* (2013.01); *B29C 48/92* (2019.02); *G01N 29/14* (2013.01);
(Continued)

(58) Field of Classification Search
CPC .... G01N 29/07; G01N 29/14; G01N 29/2412; G01N 29/27; G01N 29/28; G01N 29/348;
(Continued)

(56) References Cited

U.S. PATENT DOCUMENTS 6,824,626 B2 * 11/2004 Charrette ............ C06B 21/0075
149/19.91
2019/0152119 A1   5/2019 Norlund et al.
2021/0039298 A1 * 2/2021 Skrabala ................ B29C 48/40

FOREIGN PATENT DOCUMENTS

DE   102008047002 A1   3/2010
DE   102015102200 A1   8/2016
(Continued)

OTHER PUBLICATIONS

German Patent and Trademark Office, Office Action in Application No. 10 2019 218 387.5, dated Jul. 21, 2020, 8 pages, Munchen, Germany.
(Continued)

Primary Examiner — Suman K Nath
(74) Attorney, Agent, or Firm — Marshall & Melhorn, LLC

(57) ABSTRACT

In a measuring arrangement for determining properties of a material to be extruded while an extrusion process is being carried out in an extruder, at least one extruder screw is rotatably mounted in a tubular guide in a barrel and is connected to a rotary drive. Material to be extruded is fed to the tubular guide at one end and is removed as finish-extruded material at an oppositely arranged discharge. Arranged at measuring positions at predeterminable defined
(Continued)

intervals on the wall of the tubular guide along the longitudinal axis of the extruder screw are multiple first sound transducers, which are designed for the detection of sound waves that are generated during the extrusion process by the extrusion process as process noises and/or are emitted by a second sound transducer, arranged at one end of the tubular guide, in the direction of the longitudinal axis of the extruder screw and into the material to be extruded that is conveyed through a mixing chamber present in the tubular guide.

7 Claims, 1 Drawing Sheet

(51) Int. Cl.
   *G01N 29/07* (2006.01)
   *G01N 29/24* (2006.01)
   *G01N 29/27* (2006.01)
   *G01N 29/28* (2006.01)
   *G01N 29/34* (2006.01)
   *G01N 29/42* (2006.01)
   *G01N 29/50* (2006.01)

(52) U.S. Cl.
   CPC ......... *G01N 29/2412* (2013.01); *G01N 29/27* (2013.01); *G01N 29/28* (2013.01); *G01N 29/348* (2013.01); *G01N 29/42* (2013.01); *G01N 29/50* (2013.01); *B29C 2948/92114* (2019.02); *B29C 2948/9219* (2019.02); *B29C 2948/922* (2019.02); *B29C 2948/9238* (2019.02); *G01N 2291/011* (2013.01); *G01N 2291/015* (2013.01); *G01N 2291/02818* (2013.01); *G01N 2291/103* (2013.01)

(58) Field of Classification Search
   CPC ...... G01N 29/42; G01N 29/50; G01N 29/043; G01N 29/46; G01N 2291/011; G01N 2291/015; G01N 2291/02818; G01N 2291/103; G01N 2291/01; G01N 2291/02491; B29C 48/92; B29C 2948/92114; B29C 2948/9219; B29C 2948/922; B29C 2948/9238; B29C 2948/92314; B29C 2948/924; B29L 2031/3468
   See application file for complete search history.

(56) References Cited

FOREIGN PATENT DOCUMENTS

| | | |
|---|---|---|
| JP | H01195013 A | 4/1989 |
| JP | H07100824 A | 4/1995 |
| JP | H07186138 A | 7/1995 |
| WO | 2019110194 A1 | 6/2019 |

OTHER PUBLICATIONS

European Patent Office, International Search Report and Written Opinion in Application No. PCT/EP2020/080976, dated Mar. 3, 2021, 12 pages, Rijswijk, Netherlands.

* cited by examiner

MEASURING ARRANGEMENT AND METHOD FOR DETERMINING PROPERTIES OF A MATERIAL TO BE EXTRUDED WHILE A SCREW-EXTRUSION PROCESS IS BEING CARRIED OUT

FIELD

The invention relates to a measuring arrangement and a method for determining properties of a material to be extruded while an extrusion process is being carried out. For example, the density, the viscoelastic properties of the material to be extruded and the distribution of the particles contained therein in various process zones can be recognized in-situ before exiting the respective extruder and, optionally, taken into account in the further process control to ensure a sufficient quality of the finished extruded product.

BACKGROUND

The invention can be used in all domains of extrusion, that is, in the construction industry, the automotive industry, the aviation industry, medical technology, the furniture industry, in trade fair construction, in the packaging industry, in agriculture, in hose applications in granulation, in the plastics industry, animal feed and food industry and battery production. It is therefore suitable for a variety of products, for example,
- tubes, rods (semi-finished products)
- profiles such as window frames, cable ducts or seals
- coatings, such as for electric cables
- hoses
- foils
- treads of automobile tires
- smaller auto parts (interior door panels, rear view mirror frames)
- squeegees on the windshield wipers
- bicycle rims
- V-belts and toothed belts
- door seals
- extruded polystyrene rigid foam panels (XPS)
- pencils and colored pencils made from wood-plastic composites
- ceramics, split clinkers, perforated bricks and in foundry mold construction
- precursors in soap manufacture
- stearin candles
- pasta, snacks, biscuits, molded meat
- manufacturing of chemical fibers
- heat sinks
- battery components Extruders can be used to homogenize and/or disperse materials. These are available in different designs. These include the ram extruder, planetary roller extruder, cascade extruder and screw extruder. The screw extruder can be used both as a transport or as a processing extruder. Said screw extruder can be constructed with just one screw or with two screws, which is why the terms single-screw and twin-screw extruder are used. The screws can have different geometries, depending on the application. The different shapes are aimed at mechanically influencing the material/extrudate in order to achieve the desired properties. The latter depend not only on the geometric characteristics of the screws, but also on the type, quantity and composition of the raw material. The material should finally correspond to the desired parameters at the exit of the extruder.

Using the invention described, the change in the material to be extruded by the mechanical action of the screws can be monitored in stages within the extruder, regardless of the specific type and geometry of the (screw) extruder. As a result, changes in material and condition during extrusion can be better understood, controlled and optimized in a targeted manner, with unnecessary waste being avoided.

At present, acoustic measuring systems for inline monitoring of the extrusion process are mainly installed in front of the extruder or at the end thereof. The material to be extruded is checked for its target properties in these regions. If there are deviations or material changes, the causes thereof are subsequently difficult to understand and can no longer be influenced. In principle, an adjustment can be made to the raw material and to the parameters of the extrusion process a posteriori, the result of the optimization process only being available after a new complete extrusion of the extruded material. This can lead to the production of unusable material and a time-consuming and costly process. In addition, it is difficult to trace the causes of errors, since the influence of the screw geometry and the resulting changed states of the material are unknown.

In a known variant for inline process monitoring within the extruder, measuring points are distributed over the occupying length of the extruder. The pulse transmission method is used as the measuring principle. For this, two ultrasonic transducers with suitable measuring channels are required per measuring point, one ultrasonic transducer acting as a transmitter and the second as a receiver. There are two screws in a twin-screw extruder, the two screws being equipped with conveying and kneading elements for processing the material. The interval between the two screws is very small, as this is the only way to achieve targeted processing of the material. A sound transmission path between the screws and only through the extrudate cannot be implemented by means of this known structure. As a possible solution to this problem, the conveying and mixing elements of the screws were replaced by spacer sleeves in the regions of the measuring points. These represent a round material with a smaller diameter. The length of said spacer sleeves corresponds to the window length of a measuring point. This makes it possible for a sound transmission path to be created between the screws only through the extrudate and for the pulse transmission method to be used.

The disadvantage thereof is the direct influence on the process. The extrudate is not processed further in the regions of the measuring points, interrupting the homogenization and dispersing process. An undesirable material change can therefore occur in this resting phase in the region of a measuring point. Due to the spacer sleeves, the screws have to be custom-made, making flexible adaptation to other material systems and other types of extruders considerably more difficult or even impossible.

SUMMARY

It is therefore the object of the invention to specify options for inline condition monitoring of the material to be extruded in the interior of a screw extruder, exciting sound waves being able to be excited and guided in a screw (or the screws) themselves.

According to the invention, this object is achieved with a measuring arrangement which has the features of the claims. A method is also described. Advantageous refinements and developments of the invention can be implemented with features identified in the subordinate claims.

In the invention, at least one extruder screw is rotatably mounted in a tubular guide in a barrel and is connected to a rotary drive. Material to be extruded can be fed to the tubular guide at one end and is removed as finish-extruded material at an oppositely arranged discharge.

Arranged at measuring positions at predeterminable defined intervals directly on the wall of the tubular guide or in introduced measurement windows along the longitudinal axis of the extruder screw are multiple first sound transducers, which are designed for the detection of sound waves that are generated during the extrusion process by the extrusion process as process noises and/or are emitted by a second sound transducer, arranged at one end of the tubular guide. Sound waves sent by the second sound transducer in the direction of the longitudinal axis of the extruder screw and emitted by the extruded material present in the tubular guide in a mixing chamber can be detected by means of first sound transducers. The sound waves are therefore first coupled into the extruder screw before said sound waves are transmitted via the extruded material.

Sound waves can thus also be guided through the material to be extruded and influenced by the properties of the material to be extruded in the respective process zone, which is preferably in the conveying direction of the material to be extruded between two measuring positions at which a first sound transducer is arranged. This allows typical properties of the material to be extruded to be identified in the corresponding process zone. With a corresponding arrangement of first sound waves, this also applies to further process zones, which can be arranged one behind the other in the conveying direction.

First sound transducers can be arranged along an axis in a row arrangement on the outer wall of the tubular guide, in which at least one rotating screw is arranged and mounted rotatably. The intervals between the first sound transducers can, but do not have to, be equidistant. It is only important that the intervals between measuring positions or the position of each measuring position are known.

First sound transducers can be arranged distributed in different angular orientations over the circumference of the tubular guide. Said sound transducers can be arranged, for example, in a spiral or star shape, but should be arranged one behind the other in the conveying direction. The positions and/or intervals between first sound transducers should be known so that this can be taken into account when evaluating the measurement signals detected with them.

In principle, a second sound transducer can be arranged in the region of an end arranged in the conveying direction at the front or at the end of the extrusion process, but preferably in the region of a drive for the screw(s) at or before the start of the extrusion process.

Active surfaces of the first sound transducers can couple to the material to be extruded in the interior of the tubular guide via a protective and adjustment window or a protective layer.

The so-called leaky waves emerging over the entire length of the respective screw can be detected and analyzed by broadband first sound transducers attached laterally on or in the wall of the tubular guide. The approach does not require an extra, undisturbed sound transmission path to be created, but uses the existing path between the screw surface and the inner wall of the tubular guide to pass through the material to be extruded during the extrusion process. In principle, it is therefore suitable for all (screw) extruder types and can be adapted to a large number of different extruder geometries and materials to be extruded by changing the excitation sound frequencies.

The excitation frequency can be adjusted by using different, generally narrow-band, excitation second sound transducers. The first sound transducers, on the other hand, can be designed to be broadband, so that they can be retained unchanged even when the respective actuator is changed. However, it may also be possible here to change the first sound transducer. Narrow-band means a frequency range having a bandwidth of less than or equal to 20% and broadband means a frequency range having a bandwidth of greater than or equal to 80%.

The approach makes it possible to generate and evaluate sound wave measurement signals during the process, which can be fed back into the extrusion process in virtually real time in order to optimize the quality and yield of the finished extruded material.

Individual aspects such as the type of transducer, mechanical attachment and configuration of the transducer, the measurement principle and signal processing are examined in more detail in the following.

The emission of sound waves should take place by means of a suitable excitation in the drive region of the respective screw(s), for example, on the basis of a piezoelectric or EMAT (ElectroMagnetic Acoustic Transducer), wherein the center frequency and frequency bandwidth of the sound waves can be adapted to the respective application and the materials used. Due to the excitation with broadband impulse sound or narrow-band burst signals, mechanical waves penetrate first into the screw(s) and then into the material to be extruded itself, pass through it and can be detected on or in the extruder wall. Emission by means of EMAT makes use of the fact that sound waves are emitted in metal by means of electromagnetically initiated eddy current fields, without direct mechanical contact and no couplant being required.

Depending on the materials to be extruded, sound transducers having different parameters can be used, with frequencies in the kilohertz to megahertz range being used, depending on the material damping and running distance. The transducer diameter of the first sound transducer can also vary, taking into account the mechanical attachment. On the reception side, at which detection takes place, there is the possibility of being able to use different types of first sound transducers for detection. These include, for example, vertical transducers, angle probes, S/E transducers, focused transducers, phased array transducers, air-coupled ultrasonic transducers, EMAT transducers, etc. However, laser-ultrasonic detector units, for example, can also be used.

The sound transducers can be integrated into the extruder such that at least one second sound transducer in the drive region of the screw(s) actively emits sound waves into the screw(s) and a plurality of other broadband first sound transducers, which can be arranged along the longitudinal axis of the extruder at the outer boundary or in inner measuring channels, which can detect sound waves. The sound waves emitted by a second sound transducer propagate throughout the screw, sometimes also entering the surrounding material to be extruded and, after passing through the material to be extruded, can be detected at the first sound transducers designed for this purpose and, by means of an electronic evaluation unit, the measurement signals detected by means of the first sound transducers are evaluated to determine properties of the material to be extruded at the specified measuring positions during the extrusion process.

In order to implement such measurements, the first sound transducers can be positioned differently from the mixing chamber in which the material to be extruded is moved and influenced. Specially designed measurement windows can be provided in order to implement the mechanical instrumentation. In these embodiments, the extrusion process within the mixing chamber is not affected, in contrast to the prior art. In addition, there is no need for measurement windows on the excitation side. The detecting sound transducers are mechanically fastened in or at the measuring positions, the active surfaces of said sound transducers being able to couple to the material to be extruded in the interior via a protective and adjustment window or a corresponding protective layer. The detecting first sound transducers can be set to identical or different intervals from the longitudinal axis of the extruder, wherein a limitation of the volume occupied by the screw(s) should be excluded.

In addition to the active variant described above, in which the second sound transducer, which is preferably installed in the drive region of the respective screw and emits sound waves, actively excites as a transmitter and the first sound transducers receive and detect the signals, a purely passive variant can also be implemented as a further embodiment, in which all first sound transducers attached along the longitudinal axis of the extruder only work as a detector and detect and evaluate the process noises that occur in the form of sound waves during extrusion. In both variants, the number and/or the intervals of the detecting first sound transducers can be selected depending on the occupying length of the extruder and the respective application to be monitored, which depend in particular on the operating parameters of the respective extruder and the properties of the respective material to be extruded. For this purpose, as many first sound transducers and, optionally, measurement windows can be used and arranged in process zones as the material properties change significantly during extrusion.

Water, high-viscosity coupling gel, adhesive points, mechanical pressure or completely contact-free (air-coupled ultrasound, laser ultrasound) can be used or applied for the mechanical coupling of the sound transducers.

Compared to the prior art, the screw geometry and thus the processing of the material to be extruded are not affected. In the underlying invention, the acoustic waves actively introduced into the screw(s) by a sound transducer in the drive region of the screw(s) or the purely passive acoustic signals of the extruder can be detected by means of the first sound transducers instrumented on the occupying length of the tubular guide of the extruder and used to evaluate the extrusion process. By selecting broadband sound transducers, it can also be made possible to adapt to different material systems without additional mechanical effort.

The acoustic signals emerging from the screw and detected by the first sound transducers can be used to evaluate the extrusion process. The excitation of sound waves can take place actively via the screw(s) or purely passively through acoustic process noise.

A local transmission measurement between two directly opposite sound transducers, as is otherwise usual, does not take place with the invention, since the sound waves are first emitted by the screw, propagate therefrom and only then, in an indirect way, reach the individual first sound transducers.

Due to the different travel paths of sound waves to the detecting first sound transducers, the sound waves still carry local information about the different process zones, the information being able to be determined and taken into account by means of suitable evaluation methods based on cross-correlations or other transit time and attenuation measurements.

A pulse transfer function between the two measuring positions can be obtained by means of a cross-correlation between two sound transducer measurement signals detected at different measuring positions. This allows a local characterization of the material to be extruded between two respective measuring positions along the longitudinal axis of the extruder. The material to be extruded can be characterized by means of standard acoustic parameters, such as sound velocity and damping, these parameters of the detected sound waves being generally evaluated spectroscopically, that is, frequency-resolved. Conventional transit time and attenuation measurements can also be carried out in addition to cross-correlation.

Local averaged material properties such as density, viscosity or particle size can be determined based on the acoustic parameters.

The data acquisition during the extrusion process and the inline evaluation of the signals can be done with a suitable software which outputs the desired material parameters in real time. Process adjustments can be made immediately based on these material parameters.

Both in the active and in the passive measuring mode, the propagating sound waves will generally have a stochastic character due to the complex geometry of the screw(s) and their permanent movement during the extrusion process. For this reason, statistical parameters of the sound wave measurement signals, such as mean values, standard deviations, distribution functions and their higher moments, can also be used for the evaluation.

According to the prior art, however, a transmission approach is used in which non-statistical pulse-like signals are evaluated.

Compared to the methods used hitherto, the underlying invention makes it possible to evaluate the change in state over the entire extrusion process without influencing the process, for example, due to changes in the geometry of the screws or without the introduction of spacer sleeves. In addition, the measuring principle used in accordance with the invention enables greater flexibility when adapting the measuring system to other material systems and can also be used with all types of (screw) extruders.

In contrast to the previous offline measurements on the raw material or on the finished extrudate, the invention is a process-integrated inline measurement that produces a better yield, increased material quality and a lower reject rate. Furthermore, the traceability of material properties can be supported in the context of safety-relevant Industry 4.0 applications.

The invention can find application in the manufacturing process of battery cells. A battery consists of two electrodes, a separator and an electrolyte. The performance depends, among other things, on the electrode material. The invention can be used in the manufacture of the electrode material. There, a carrier foil (typically aluminum or copper foil) is coated with electrode material. When manufacturing electrode material, it is important that the finished material has a homogeneous character and the required parameters. Parameters such as viscosity, density and particle size are of great relevance.

The electrode material is often manufactured using an extrusion process. By monitoring said manufacturing process using the underlying invention, it is possible to record the material change during extrusion and, if necessary, to optimize it by adding or throttling individual material components. The acoustic parameters of sound velocity and attenuation are used to determine the elastic and viscoelastic moduli of the material to be extruded.

DESCRIPTION OF THE FIGURES

The invention is to be explained in more detail below by way of example.

In the drawings.

DETAILED DESCRIPTION

Figure 1:
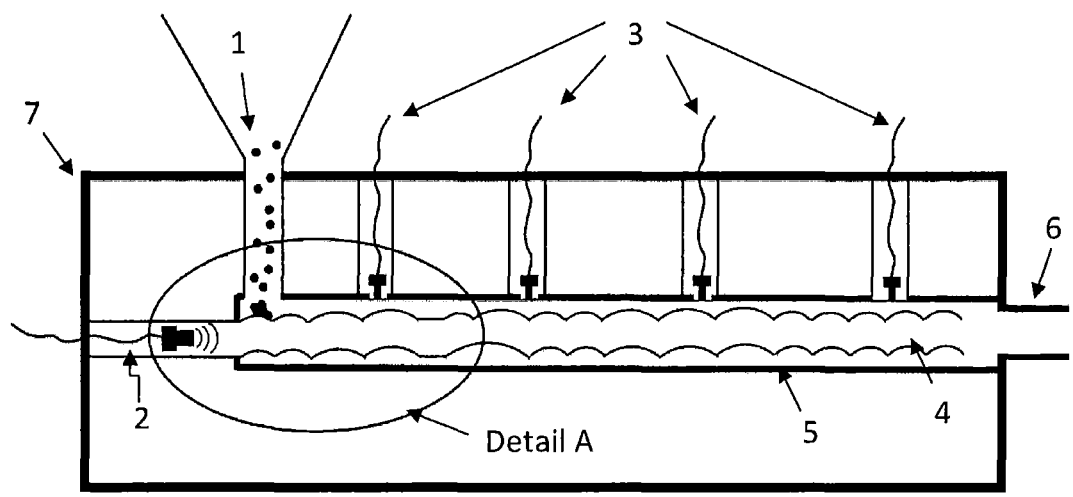
FIG. 1 in a schematic representation, an example of a measuring arrangement in accordance with the invention FIG. 2 detail A from FIG. 1 on an enlarged representation.
Figure 2:
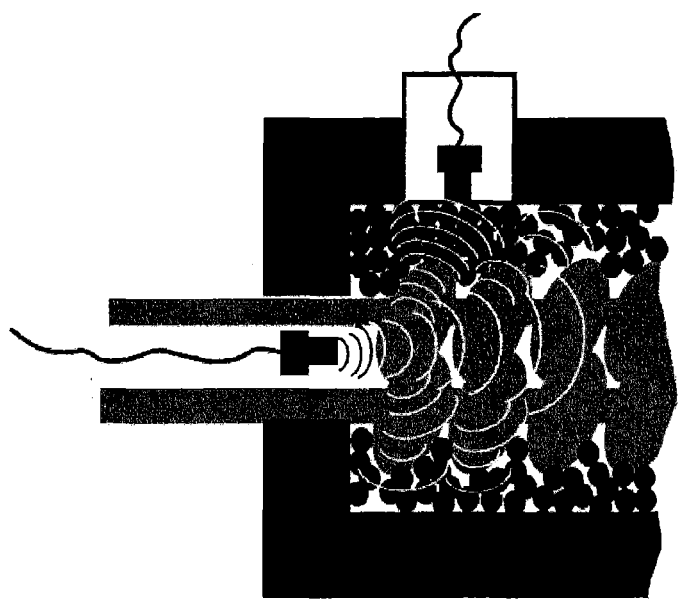

FIG. 1 shows an example of a measuring arrangement in accordance with the invention on an extruder 7. In this example, a screw 4 is rotatably mounted in a tubular guide 5 and is driven by a rotary drive, not shown.

Material 1 to be extruded is introduced via a feeder into a mixing chamber arranged inside the tubular guide 5 and formed by means of a gap between the inner wall of the tubular guide and the outer wall of the screw 4. In the case of two screws which rotate around axes of rotation aligned parallel to one another and are arranged next to one another, the volume in the gap between the outer surfaces of the screws is added to the mixing chamber.

The material to be extruded is conveyed through the tubular guide 5 to the exit 6 by means of the rotation of the screw.

In this example, four first sound transducers 3 are arranged on the outer wall of the tubular guide 5, with which sound transducers sound waves can be detected. The four first sound transducers 3 are connected to the electronic evaluation unit, with which a frequency-resolved evaluation of the sound waves detected at the measuring positions of the first sound transducers 3 is carried out, by means of lines routed through channels from the extruder 7 to an electronic evaluation unit (not shown).

In the example shown, a second sound transducer 2 is arranged in the tubular guide 5 in the region of the rotary drive of the screw 4 (not shown), with which second sound transducer sound waves are emitted into the screw 4 and the material 1 to be extruded. In this case, sound waves of different frequencies can be emitted, taking into account the respective material 1 to be extruded. However, the frequency can also be selected such that it is optimized for a specific measuring position at which a first sound transducer 3 is arranged. For this purpose, the properties of the material 1 to be extruded in the associated process zone and/or the interval between the second sound transducer 2 and the corresponding first sound transducer 3 arranged there can be taken into account.

The evaluation of the sound wave measurement signals detected by meas of the first sound transducers 3 is as follows:

At any given time, $t_i$, i=1, . . . N

Filtering the measurement signals to remove any high-frequency noise.

Cross-correlating the measurement signals from different first sound transducers 3 in order to obtain the pulse transfer functions between the measuring positions at which the first sound transducers 3 are arranged. As an alternative to this, a direct evaluation of the individual measurement signals without cross-correlation or alternatively a statistical evaluation of the individual measurement signals with regard to the moments of their distribution can be carried out.

In the case of cross-correlation and direct signal evaluation, a spectral analysis of the frequency-dependent transit times and amplitudes or, alternatively, a non-spectral cumulative analysis can be carried out.

Comparing the measurement results that were detected at different measuring positions (direct and statistical evaluation) or the measurement results resulting from cross-correlation between different measuring positions.

Establishing the correlation of the measurement results to relevant process parameters using prerecorded calibration curves; optionally, temporal changes in the measurement results in the ongoing process can be taken into account without prior calibration.

The invention claimed is:

1. A measuring arrangement for determining properties of a material to be extruded while an extrusion process is being carried out in an extruder, comprising:

at least one extruder screw rotatably mounted in a tubular guide in a barrel, said at least one extruder screw is connected to a rotary drive and material to be extruded can be fed to the tubular guide at one end and can be removed as finish-extruded material at an oppositely arranged discharge, and multiple first sound transducers arranged at measuring positions at predeterminable defined intervals on a wall of the tubular guide along the longitudinal axis of the extruder screw, said multiple first sound transducers adapted for the detection of sound waves that are at least generated as extrusion process noise by the extrusion process or are emitted by a second sound transducer, arranged at one end of the tubular guide, in the direction of a longitudinal axis of the at least one extruder screw and into the material to be extruded that is conveyed through a mixing chamber present in the tubular guide.

2. The measuring arrangement according to claim 1, when the sounds waves are emitted by the second sound transducer, wherein the second sound transducer is arranged in the region of the end of the tubular guide which is arranged in the conveying direction of the material to be extruded before or at the start of the extrusion process.

3. The measuring arrangement according to claim 1, wherein the multiple first sound transducers are arranged distributed in different angular orientations over the circumference of the tubular guide.

4. The measuring arrangement according to claim 1, wherein active surfaces of the first acoustic transducers couple to the material to be extruded in the interior of the tubular guide via a protective and adjustment window or a protective layer.

5. A method for determining properties of a material to be extruded while an extrusion process is being carried out using a measuring arrangement according to claim 1, in which transit times and/or amplitudes of sound waves are detected in a frequency-resolved manner via the first sound transducers and properties of the material to be extruded are determined via an electronic evaluation unit in respective process zones, which are arranged along the conveying direction of the material to be extruded.

6. The method according to claim 5, wherein a cross-correlation with detected sound measurement signals which have been detected between two first sound transducers each arranged at different measuring positions and a pulse transmission function of the sound measurement signals which have been detected at said two measuring positions is thus obtained.

7. The method according to claim 5, wherein mean values, standard deviations, distribution functions and their higher moments of the detected sound wave measurement signals are taken into account.

\* \* \* \* \*